United States Patent
Ito et al.

(10) Patent No.: US 11,948,754 B2
(45) Date of Patent: Apr. 2, 2024

(54) THREE-TERMINAL CAPACITOR WITH CYLINDRICAL MAIN BODY AND ELECTRONIC COMPONENT INCLUDING THE SAME

(71) Applicant: Murata Manufacturing Co., Ltd., Nagaokakyo (JP)

(72) Inventors: Shingo Ito, Nagaokakyo (JP); Koichi Ikeda, Nagaokakyo (JP); Ken Takakura, Nagaokakyo (JP); Satoshi Yoshida, Nagaokakyo (JP); Syuichi Nabekura, Nagaokakyo (JP); Takahiro Hirao, Nagaokakyo (JP); Masanori Nakamura, Nagaokakyo (JP); Kyosuke Uno, Nagaokakyo (JP); Haruhiko Ueno, Nagaokakyo (JP); Yohei Mukobata, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 345 days.

(21) Appl. No.: 17/501,001

(22) Filed: Oct. 14, 2021

(65) Prior Publication Data
US 2022/0130617 A1    Apr. 28, 2022

(30) Foreign Application Priority Data

Oct. 28, 2020 (JP) ................................. 2020-180213

(51) Int. Cl.
*H01G 4/35* (2006.01)
*H01G 4/232* (2006.01)

(52) U.S. Cl.
CPC ............... *H01G 4/35* (2013.01); *H01G 4/232* (2013.01)

(58) Field of Classification Search
CPC ............ H01G 4/35; H01G 4/012; H01G 4/33; H01G 4/385; H01G 4/40
See application file for complete search history.

(56) References Cited

U.S. PATENT DOCUMENTS

| | | | |
|---|---|---|---|
| 2004/0125535 A1* | 7/2004 | Mehr | H01G 4/232 361/301.2 |
| 2009/0259265 A1* | 10/2009 | Stevenson | A61N 1/37512 607/2 |

(Continued)

FOREIGN PATENT DOCUMENTS

| | | |
|---|---|---|
| JP | 57-128131 U | 8/1982 |
| JP | 59-115515 A | 7/1984 |

(Continued)

*Primary Examiner* — David M Sinclair
*Assistant Examiner* — Daniel M Dubuisson
(74) *Attorney, Agent, or Firm* — Keating & Bennett, LLP

(57) ABSTRACT

A three-terminal capacitor includes a main body having a cylindrical or substantially cylindrical shape extending in a first direction and including first and second inner electrodes alternately laminated together with dielectric layers interposed therebetween, a pair of first outer electrodes on two end surfaces of the main body in the first direction and electrically connected to the first inner electrodes, and a second outer electrode electrically connected to the second inner electrodes. The main body includes a projecting portion projecting in a direction perpendicular or substantially perpendicular to the first direction at a position between the pair of first outer electrodes. The second outer electrode is provided on one surface of the projecting portion viewable when viewed in the first direction.

20 Claims, 13 Drawing Sheets

(56) References Cited

U.S. PATENT DOCUMENTS

| | | | |
|---|---|---|---|
| 2015/0043261 A1* | 2/2015 | Koshi | H01G 4/232 |
| | | | 361/303 |
| 2015/0255216 A1* | 9/2015 | Mishra | H01G 4/35 |
| | | | 361/301.4 |
| 2016/0005540 A1* | 1/2016 | Tanner | H01G 4/224 |
| | | | 361/301.3 |
| 2017/0207028 A1* | 7/2017 | Martinez | H01G 4/35 |
| 2019/0164884 A1 | 5/2019 | Kasamatsu et al. | |
| 2019/0326061 A1* | 10/2019 | Tomizawa | H01G 2/065 |

FOREIGN PATENT DOCUMENTS

| | | |
|---|---|---|
| JP | 2001-155954 A | 6/2001 |
| WO | 2018/088293 A1 | 5/2018 |

\* cited by examiner

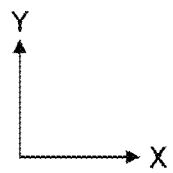

THREE-TERMINAL CAPACITOR WITH CYLINDRICAL MAIN BODY AND ELECTRONIC COMPONENT INCLUDING THE SAME

CROSS REFERENCE TO RELATED APPLICATIONS

This application claims the benefit of priority to Japanese Patent Application No. 2020-180213 filed on Oct. 28, 2020. The entire contents of this application are hereby incorporated herein by reference.

BACKGROUND OF THE INVENTION

1. Field of the Invention

The present invention relates to a three-terminal capacitor and an electronic component.

2. Description of the Related Art

Three-terminal capacitors that are provided in electronic components for the purpose of, for example, removing high-frequency noise are known.

International Publication No. 2018/088293 discloses an electronic component 350 in which a three-terminal capacitor 300 is provided as illustrated in FIG. 13. More specifically, the electronic component 350 includes a motherboard 310, an interposer 320 that has a first surface on which a semiconductor chip 330 is mounted with solder bumps 340 interposed therebetween and that is mounted on the motherboard 310 in a state where a second surface thereof, which is opposite to the first surface, faces a mounting surface of the motherboard 310, and the three-terminal capacitor 300 that is disposed between the motherboard 310 and the interposer 320.

A plurality of hot-side lands 311H of the motherboard 310 and a plurality of hot-side lands 321H of the interposer 320 are connected to each other by hot-side solder bumps 400H. In addition, a plurality of ground-side lands 311G of the motherboard 310 and a plurality of ground-side lands 321G of the interposer 320 are connected to each other by ground-side solder bumps 400G.

Note that the motherboard 310 further includes lands 311R other than the hot-side lands 311H and the ground-side lands 311G, and the interposer 320 further includes lands 321R other than the hot-side lands 321H and the ground-side lands 321G. The lands 311R of the motherboard 310 and the lands 321R of the interposer 320 are connected to each other by solder bumps 400R.

The three-terminal capacitor 300 includes two ground-side outer electrodes and two hot-side outer electrodes. The ground-side outer electrodes of the three-terminal capacitor 300 are connected to the ground-side solder bumps 400G, and the hot-side outer electrodes of the three-terminal capacitor 300 are connected to the hot-side solder bumps 400H.

International Publication No. 2018/088293 describes that, with the above-described configuration, leakage of noise to ground wiring lines and to power-supply wiring lines that are arranged in the motherboard 310 and in the interposer 320 can be suppressed.

With the improvement of the performance of semiconductor chips, there has been a growing demand for mounting of a large number of three-terminal capacitors. However, as in the electronic component described in International Publication No. 2018/088293, in a configuration in which a three-terminal capacitor is disposed separately from solder bumps, there is a limitation on the number of three-terminal capacitors that can be arranged due to the limited installation space.

SUMMARY OF THE INVENTION

Preferred embodiments of the present invention provide three-terminal capacitors that each enable mounting of a larger number of the three-terminal capacitors on a substrate and electronic components that each include such three-terminal capacitors.

A three-terminal capacitor according to a preferred embodiment of the present invention includes a main body having a cylindrical or substantially cylindrical shape extending in a first direction and including first inner electrodes and second inner electrodes alternately laminated together with dielectric layers interposed between the first inner electrodes and the second inner electrodes, a pair of first outer electrodes on two end surfaces of the main body in the first direction and electrically connected to the first inner electrodes, and a second outer electrode electrically connected to the second inner electrodes. The main body includes a projecting portion projecting in a direction perpendicular or substantially perpendicular to the first direction at a position between the pair of first outer electrodes. The second outer electrode is provided on one surface of the projecting portion that is viewable when viewed in the first direction.

An electronic component according to a preferred embodiment of the present invention includes a three-terminal capacitor according to a preferred embodiment of the present invention, a first substrate including a mounting surface on which a first hot-side land and a first ground-side land are provided, and a second substrate including a surface that faces the mounting surface and on which a second hot-side land and a second ground-side land are provided. The three-terminal capacitor is disposed such that one of the pair of first outer electrodes and another one of the pair of first outer electrodes are respectively connected to the first hot-side land and the second hot-side land and such that the second outer electrode is electrically connected to one of the first ground-side land and the second ground-side land.

An electronic component according to a preferred embodiment of the present invention includes a three-terminal capacitor according to a preferred embodiment of the present invention, a first substrate including a mounting surface on which a first hot-side land and a first ground-side land are provided, and a second substrate including a surface that faces the mounting surface and on which a second hot-side land and a second ground-side land are provided. The three-terminal capacitor is disposed such that one of the pair of first outer electrodes and another one of the pair of first outer electrodes are respectively connected to the first ground-side land and the second ground-side land, and such that the second outer electrode is electrically connected to one of the first hot-side land and the second hot-side land.

In each of the three-terminal capacitors according to preferred embodiments the present invention, the pair of first outer electrodes are provided on the two end surfaces of the main body, and the second outer electrode is provided on one of the surfaces of the projecting portion of the main body, the one surface being viewable when viewed in the first direction. When each of the three-terminal capacitors according to preferred embodiments of the present invention is disposed between the two substrates, the three-terminal capacitor is disposed such that the pair of first outer electrodes are connected to the hot-side lands of the two substrates and such that the second outer electrode is connected to at least one of the ground-side lands provided on the two substrates. Alternatively, the three-terminal capacitor is disposed such that the pair of first outer electrodes are connected to the ground-side lands of the two substrates and such that the second outer electrode is connected to the hot-side lands provided on the two substrates. With such a mounting configuration, each of three-terminal capacitors according to preferred embodiments of the present invention can also define and function as a solder bump that electrically connects the two substrates to each other, and thus, unlike the electronic component described in International Publication No. 2018/088293, it is necessary to dispose the three-terminal capacitor separately from a large number of solder bumps. In other words, by using the three-terminal capacitors according to preferred embodiments of the present invention, a larger number of three-terminal capacitors can be provided between two substrates.

In each of the electronic components according to preferred embodiments of the present invention, the three-terminal capacitor is disposed such that one of the pair of first outer electrodes and another one of the pair of first outer electrodes are respectively connected to the first hot-side land and the second hot-side land, and such that the second outer electrode is electrically connected to at least one of the first ground-side land and the second ground-side land. In each of the electronic components according to preferred embodiments of the present invention, the three-terminal capacitor is disposed such that one of the pair of first outer electrodes and another one of the pair of first outer electrodes are respectively connected to the first ground-side land and the second ground-side land and such that the second outer electrode is electrically connected to the first hot-side land and the second hot-side land. Therefore, the three-terminal capacitor also defines and functions as a solder bump that electrically connects the hot-side land of the first substrate and the hot-side land of the second substrate to each other or electrically connects the ground-side land of the first substrate and the ground-side land of the second substrate to each other, and thus, by disposing the three-terminal capacitor instead of a solder bump, a larger number of three-terminal capacitors can be arranged.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below to specifically describe features of the present invention with reference to the drawings.

First Preferred Embodiment

Figure 1:
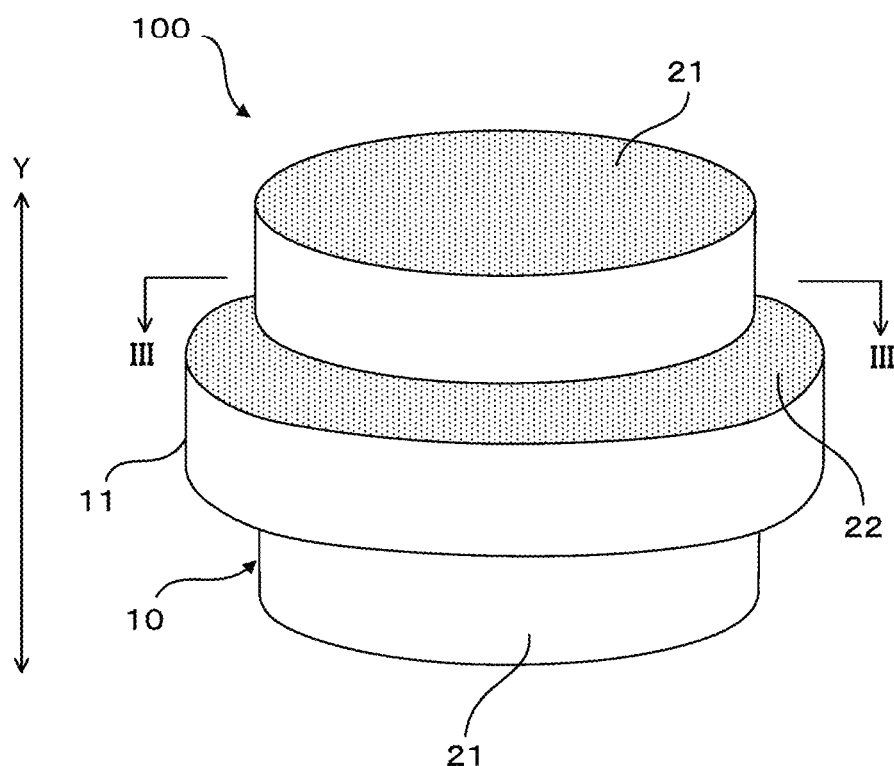
FIG. 1 is a perspective view schematically illustrating a configuration of a three-terminal capacitor according to a first preferred embodiment of the present invention.
Figure 2:
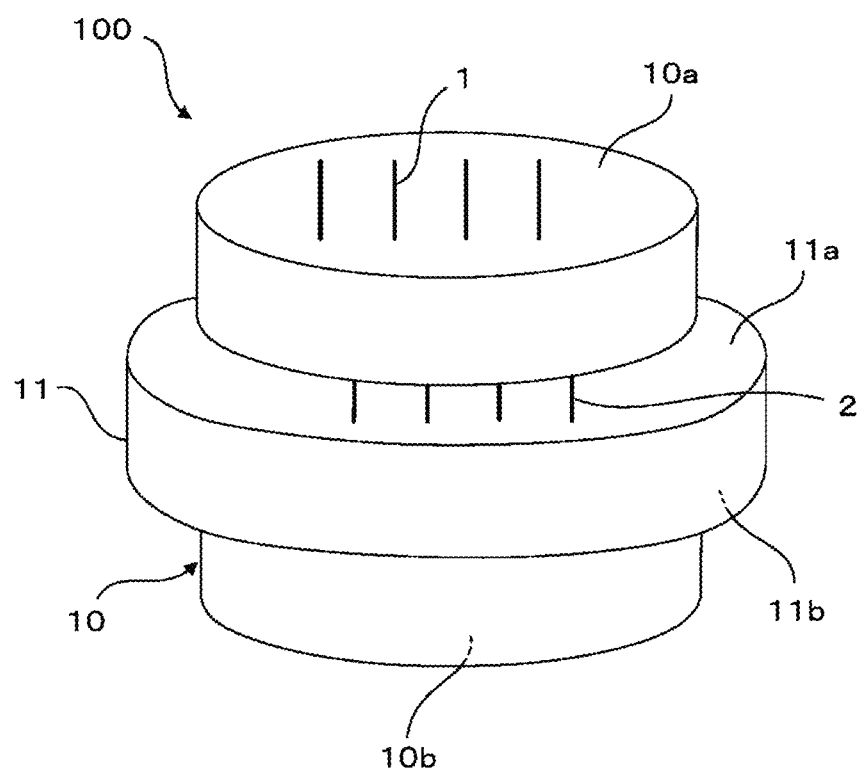
FIG. 2 is a diagram illustrating a state where first outer electrodes and a second outer electrode have been removed from the three-terminal capacitor illustrated in FIG. 1.
Figure 3:
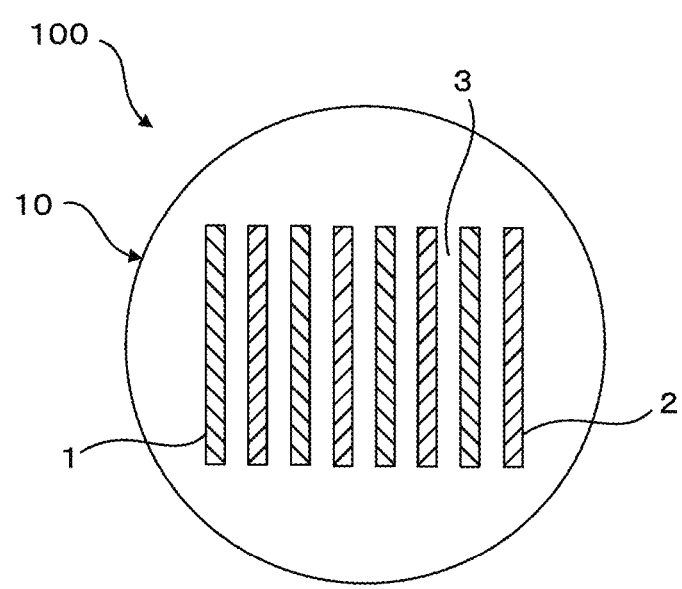
FIG. 3 is a schematic cross-sectional view of the three-terminal capacitor illustrated in FIG. 1 taken along line of FIG. 1.

FIG. 1 is a perspective view schematically illustrating a configuration of a three-terminal capacitor 100 according to a first preferred embodiment of the present invention. FIG. 2 is a diagram illustrating a state where first outer electrodes 21 and a second outer electrode 22 have been removed from the three-terminal capacitor 100 illustrated in FIG. 1. FIG. 3 is a schematic cross-sectional view of the three-terminal capacitor 100 illustrated in FIG. 1 taken along line III-III of FIG. 1.

The three-terminal capacitor 100 according to the first preferred embodiment has a cylindrical or substantially cylindrical shape that extends in a first direction (the Y direction in FIG. 1) and includes a main body 10 that includes first inner electrodes 1 and second inner electrodes 2 that are alternately laminated together with dielectric layers 3 interposed therebetween, the pair of first outer electrodes 21 that are provided on two end surfaces 10a and 10b of the main body 10 in the first direction and electrically connected to the first inner electrodes 1, and the second outer electrode 22 that is electrically connected to the second inner electrodes 2.

In the present preferred embodiment, the main body 10 has a cylindrical or substantially circular cylindrical shape. However, the main body 10 is not limited to having a cylindrical or substantially circular cylindrical shape and may have a quadrangular or substantially quadrangular prism shape or an elliptical or substantially elliptical cylinder shape, for example.

The main body 10 includes a projecting portion 11 that projects in a direction perpendicular or substantially perpendicular to the first direction at a position between the pair of first outer electrodes 21. In the present preferred embodiment, as illustrated in FIG. 1, the main body 10 includes the projecting portion 11 at a central portion thereof in the first direction. In the present preferred embodiment, the projecting portion 11 has the same or substantially the same central axis as the main body 10 and has a circular or substantially circular cylindrical shape with an outer diameter larger than that of the main body 10.

In the present preferred embodiment, the projecting portion 11 includes a first surface 11a and a second surface 11b that are parallel or substantially parallel to the two end surfaces 10a and 10b of the main body 10. The first surface 11a is located on the side on which the first end surface 10a is present, and the second surface 11b is located on the side on which the second end surface 10b is present.

The dimension of the main body 10 in the first direction is, for example, about 80 µm or more and about 140 µm or less and is set to about 110 µm as an example. When viewed in the first direction, the diameter of the main body 10 excluding the projecting portion 11 is, for example, about 230 µm or more and about 320 µm or less and is set to about 230 µm as an example. The dimension of the projecting portion 11 in the first direction is, for example, about 30 µm or more and about 50 µm or less and is set to about 40 µm as an example. When viewed in the first direction, the outer diameter of the projecting portion 11 is, for example, about 250 µm or more and about 340 µm or less and is set to about 300 µm as an example. In the first direction, the dimension from each of the end surfaces 10a and 10b of the main body 10 to the projecting portion 11 is, for example, about 25 µm or more and about 55 µm or less and is set to about 35 µm as an example.

In the present preferred embodiment, as illustrated in FIG. 3, the first inner electrodes 1, the dielectric layers 3, and the second inner electrodes 2 are laminated together in a direction perpendicular or substantially perpendicular to the first direction. In the present preferred embodiment, the direction perpendicular or substantially perpendicular to the first direction is the radial direction of the main body 10 having a circular or substantially circular cylindrical shape. Although FIG. 3 illustrates an example where the four first inner electrodes 1 and the four second inner electrodes 2 are provided, the number of the first inner electrodes 1 and the number of the second inner electrodes 2 are not limited to four.

As illustrated in FIG. 2, in the state where the first outer electrodes 21 have been removed from the main body 10, the first inner electrodes 1 are exposed at the first end surface 10a, whereas the second inner electrodes 2 are not exposed. Similarly, in the state where the first outer electrodes 21 have been removed from the main body 10, the first inner electrodes 1 are exposed at the second end surface 10b, whereas the second inner electrodes 2 are not exposed. The first inner electrodes 1 are electrically connected to the first outer electrodes 21, which will be described later, by being directly connected to the first outer electrodes 21 on the two end surfaces 10a and 10b of the main body 10.

As illustrated in FIG. 2, in the state where the second outer electrode 22 has been removed from the main body 10, the second inner electrodes 2 are exposed at the first surface 11a of the projecting portion 11 of the main body 10, whereas the first inner electrodes 1 are not exposed. In addition, neither the first inner electrodes 1 nor the second inner electrodes 2 are exposed at the second surface 11b of the projecting portion 11 of the main body 10. The second inner electrodes 2 are electrically connected to the second outer electrode 22, which will be described later, by being directly connected to the second outer electrode 22 on the first surface 11a of the main body 10.

Figure 4A:
FIG. 4A and FIG. 4B are respectively a plan view illustrating the shape of a first inner electrode and a plan view illustrating the shape of a second inner electrode.
Figure 4B:
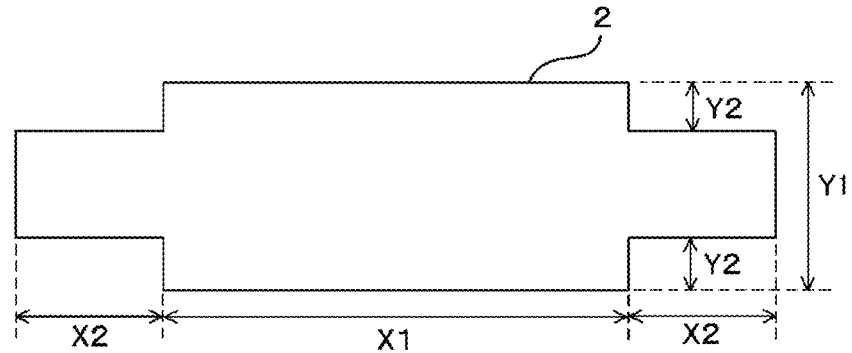

FIG. 4A is a plan view illustrating the shape of each of the first inner electrodes 1 when viewed in a lamination direction, and FIG. 4B is a plan view illustrating the shape of each of the second inner electrodes 2.

As illustrated in FIG. 4A, each of the first inner electrodes 1 has a rectangular or substantially rectangular shape. In FIG. 4A, the dimension of each of the first inner electrodes 1 in the X direction is, for example, about 162 µm or more and about 226 µm or less and is set to about 170 µm as an example. The dimension of each of the first inner electrodes 1 in the Y direction is, for example, about 70 µm or more and about 138 µm or less and is set to about 104 µm as an example. The thickness of each of the first inner electrodes 1 is, for example, about 0.3 µm or more and about 10 µm or less and is set to about 1 µm as an example.

As illustrated in FIG. 4B, each of the second inner electrodes 2 has a cross shape or a substantially cross shape. A dimension X1 of a central portion of the second inner electrode 2, which is illustrated in FIG. 4B, in the X direction is, for example, about 162 µm or more and about 226 µm or less and is set to about 170 µm as an example. A dimension X2 of each end portion of the second inner electrode 2 in the X direction is, for example, about 40 µm or more and about 70 µm or less and is set to about 55 µm as an example. A dimension Y1 of the second inner electrode 2 in the Y direction is, for example, about 40 µm or more and about 68 µm or less is set to about 50 µm as an example. A dimension Y2 of each of the end portions of the second inner electrode 2 in the Y direction is, for example, about 5 µm or more and about 19 µm or less and is set to about 10 µm as an example. The thickness of the second inner electrode 2 is, for example, about 0.3 µm or more and about 10 µm or less and is set to about 1 µm as an example.

The first inner electrodes 1 and the second inner electrodes 2 each include, for example, a metal such as Ni, Ag, Pd, Au, Cu, Ti, or Cr, an alloy including one of these metals as a main component, or the like. The first inner electrodes 1 and the second inner electrodes 2 may include, as a common material, a ceramic material that is the same as a ceramic included in the dielectric layers 3, which will be described later. In this case, the percentage of the common material included in each of the first and second inner electrodes 1 and 2 is, for example, about 20 vol % or less.

Note that all of the materials of the plurality of first inner electrodes 1 and all of the materials of the plurality of second inner electrodes 2 do not need to be the same, and the first inner electrodes 1 and the second inner electrodes 2 may be made of different materials. In addition, in one of the first inner electrodes 1 and one of the second inner electrodes 2, different materials may be partially used.

Each of the dielectric layers 3 is made of, for example, a ceramic material that includes, as a main component, $BaTiO_3$, $CaTiO_3$, $SrTiO_3$, $CaZrO_3$, or the like. The main component, which is one of the above components, may include a subcomponent such as, for example, a Mn compound, an Fe compound, a Cr compound, a Co compound, a Ni compound, or the like. The thickness of each of the dielectric layers 3 is, for example, about 0.3 µm or more and about 30 µm or less and is set to about 1 µm as an example.

As described above, the first outer electrodes 21 are provided on the two end surfaces of the main body 10 in the first direction, that is, the first end surface 10a and the second end surface 10b. In the present preferred embodiment, although the first outer electrodes 21 are provided on the entire or substantially the entire end surfaces 10a and 10b of the main body 10, the first outer electrodes 21 may be provided on only portions of the end surfaces 10a and 10b as long as they are electrically connected to the first inner electrodes 1. When viewed in the first direction, the first outer electrodes 21 each have a circular or substantially circular shape, and the diameter of the substantially circular shape is, for example, about 230 µm or more and about 320 µm or less and is set to about 230 µm as an example.

The second outer electrode 22 is provided on one of the surfaces of the projecting portion 11 of the main body 10, the one surface being viewable when viewed in the first direction. Here, the surface that is viewable when viewed in the first direction may be, for example, a surface that is parallel or substantially parallel to the two end surfaces 10a and 10b of the main body 10 extending in the direction perpendicular or substantially perpendicular to the first direction or a surface that is inclined with respect to the surface parallel or substantially parallel to the two end surfaces 10a and 10b, and at least a surface that extends in the first direction is excluded. In the present preferred embodiment, the second outer electrode 22 is provided on the first surface 11a that is parallel or substantially parallel to the two end surfaces 10a and 10b of the main body 10 and that is located on the side on which the first end surface 10a is present. When viewed in the first direction, the first surface 11a of the projecting portion 11 has an annular or substantially annular shape. Although the second outer electrode 22 is provided on the entire or substantially the entire first surface 11a of the projecting portion 11, the second outer electrode 22 may be provided only on a portion of the first surface 11a as long as it is electrically connected to the second inner electrodes 2.

Note that the second outer electrode 22 may be provided on the second surface 11b that is parallel or substantially parallel to the two end surfaces 10a and 10b of the main body 10 and that is located on the side on which the second end surface 10b is present.

The first outer electrodes 21 and the second outer electrode 22 each include, for example, a metal such as Ni, Ag, Pd, Au, Cu, Ti, or Cr, an alloy including one of these metals as a main component, or the like. The first outer electrodes 21 and the second outer electrode 22 may include, as a common material, a ceramic material that is the same as the ceramic contained in the dielectric layers 3 or may include glass. In either case, the percentage of the common material or glass included in each of the first and second outer electrodes 21 and 22 is, for example, about 30 vol % or more and about 70 vol % or less of the whole outer electrode.

The thickness of each of the first outer electrodes 21 and the thickness of the second outer electrode 22 are each, for example, about 3 µm. Note that an electrically conductive layer made of a material that is different from the materials of the first and second outer electrodes 21 and 22 may be provided on a portion of or the entire surface of each of the first outer electrodes 21 and on a portion of or the entire surface of the second outer electrode 22.

The above-described three-terminal capacitor 100 can be manufactured by using, for example, a 3D printer. In this case, the three-terminal capacitor 100 having the above-described structure is manufactured by ink-jet printing using an ink for dielectric layers, an ink for inner electrodes, and an ink for outer electrodes.

Electronic Component

Next, a configuration of an electronic component that includes the three-terminal capacitors 100 according to the first preferred embodiment will be described.

Figure 5:
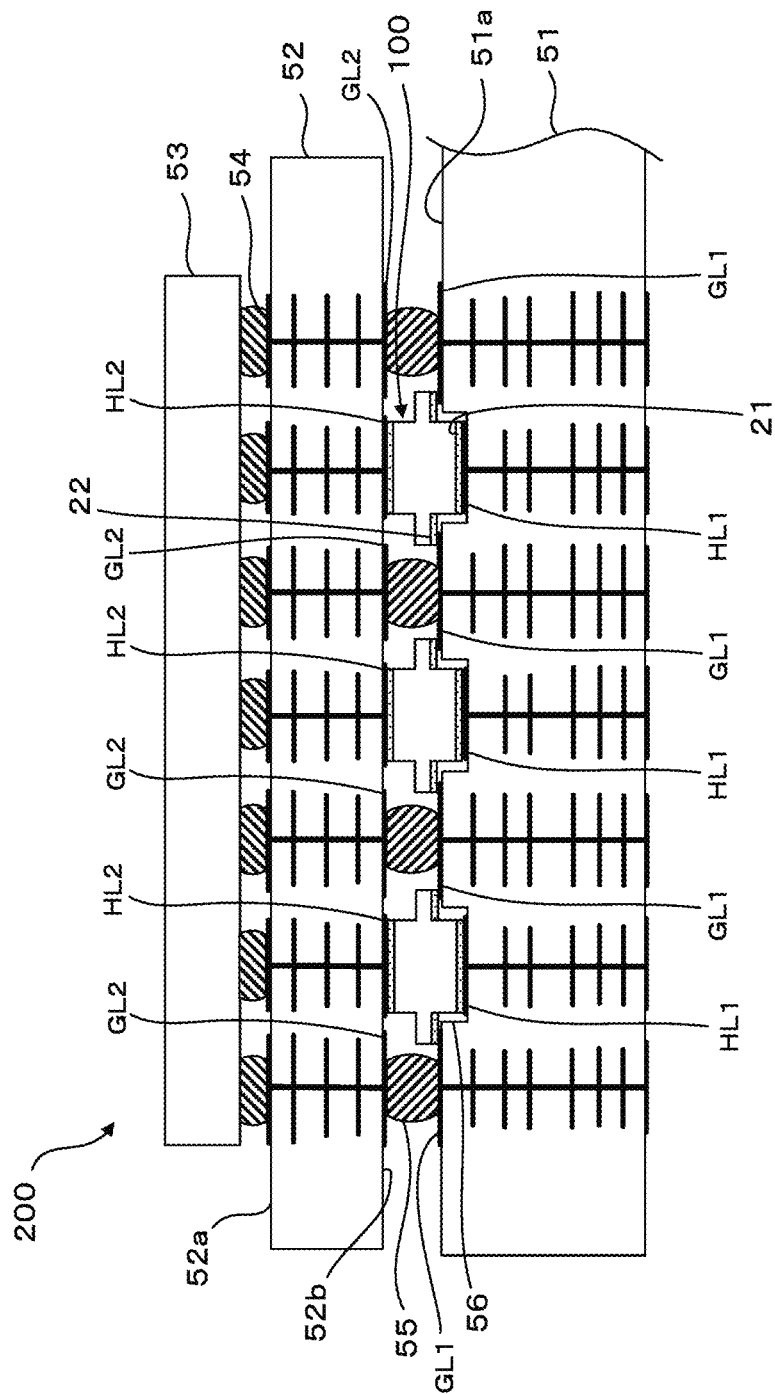
FIG. 5 is a sectional side view schematically illustrating a configuration of an electronic component in which the three-terminal capacitors according to the first preferred embodiment of the present invention are positioned between a first substrate and a second substrate.

FIG. 5 is a sectional side view schematically illustrating a configuration of an electronic component 200 in which the three-terminal capacitors 100 according to the first preferred embodiment are provided between a first substrate 51 and a second substrate 52. The first substrate 51 is, for example, a motherboard, and the second substrate 52 is, for example, an interposer.

A plurality of first ground-side lands GL1 and a plurality of first hot-side lands HL1 are provided on a mounting surface 51a of the first substrate 51.

A semiconductor chip 53 is mounted on a first surface 52a of the second substrate 52 with a plurality of solder bumps 54 interposed therebetween. A plurality of second ground-side lands GL2 and a plurality of second hot-side lands HL2 are provided on a second surface 52b of the second substrate 52 that is opposite to the first surface 52a. The second surface 52b of the second substrate 52 faces the mounting surface 51a of the first substrate 51.

The first ground-side lands GL1 of the first substrate 51 are connected to the second ground-side lands GL2 of the second substrate 52 by solder bumps 55. The first ground-side lands GL1 of the first substrate 51 and the second ground-side lands GL2 of the second substrate 52 are electrically connected to the ground.

As will be described later, the three-terminal capacitors 100 are arranged in the following manner. One of the pair of first outer electrodes 21 of each of the three-terminal capacitors 100 is connected to one of the first hot-side lands HL1 of the first substrate 51, and the other of the pair of first outer electrodes 21 is connected to one of the second hot-side lands HL2 of the second substrate 52. The second outer electrodes 22 of the three-terminal capacitors 100 are electrically connected to at least one of the first ground-side lands GL1 and the second ground-side lands GL2.

As illustrated in FIG. 5, the first substrate 51 includes holes 56 in which the three-terminal capacitors 100 are partially accommodated. Each of the three-terminal capacitors 100 is disposed such that one of the pair of first outer electrodes 21 is positioned in one of the holes 56 and such that the second outer electrode 22 is electrically connected to at least one of the first ground-side lands GL1 of the first substrate 51 by being in contact with the at least one first ground-side land GL1. In other words, the depth of each of the holes 56 is adjusted such that, in a state where the three-terminal capacitors 100 are partially accommodated in the holes 56, the second outer electrodes 22 are in contact with their respective first ground-side lands GL1 of the first substrate 51.

The first hot-side lands HL1 are provided on the bottom surfaces of the holes 56 of the first substrate 51. In a state where the three-terminal capacitors 100 are partially accommodated in the holes 56, one of the pair of first outer electrodes 21 of each of the three-terminal capacitors 100 is electrically connected to the corresponding first hot-side land HL1 of the first substrate 51, and the other of the pair of first outer electrodes 21 is electrically connected to the corresponding second hot-side land HL2 of the second substrate 52.

In other words, the first hot-side lands HL1 of the first substrate 51 and the second hot-side lands HL2 of the second substrate 52 are electrically connected to one another by the three-terminal capacitors 100. Thus, the three-terminal capacitors 100 according to the present preferred embodiment define and function not only as capacitors that remove high-frequency noise but also as solder bumps that electrically connect the first hot-side lands HL1 of the first substrate 51 and the second hot-side lands HL2 of the second substrate 52 to each other.

Figure 13:
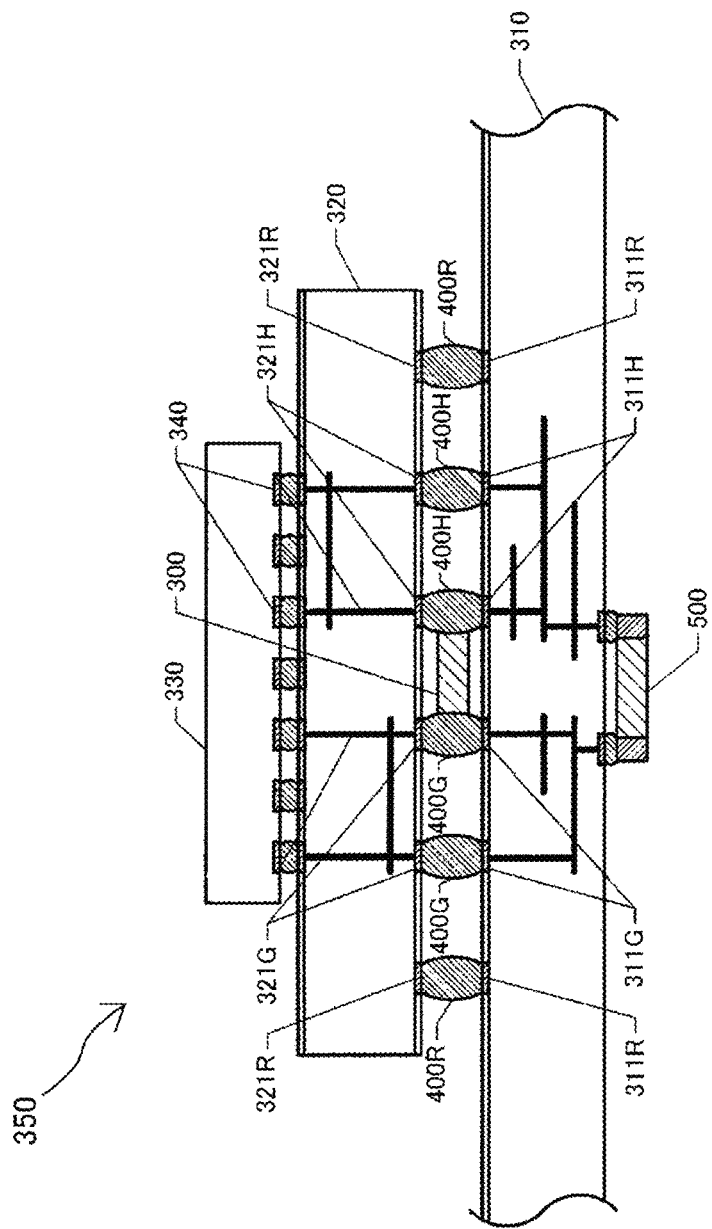
FIG. 13 is a sectional side view illustrating a configuration of an electronic component described in International Publication No. 2018/088293.

Therefore, although it is necessary to provide the three-terminal capacitor 300 separately from the plurality of solder bumps 400H in the electronic component 350 that is described in International Publication No. 2018/088293 and illustrated in FIG. 13, by using the three-terminal capacitors 100 according to the present preferred embodiment, it is not necessary to provide the three-terminal capacitors 100 separately from a plurality of solder bumps, and thus, a larger number of three-terminal capacitors 100 can be mounted.

In addition, the second outer electrode 22 is provided on one of the surfaces of the projecting portion 11 which projects from the main body 10, the one surface being parallel or substantially parallel to the two end surfaces 10a and 10b of the main body 10, and thus, by arranging the three-terminal capacitors 100 such that the three-terminal capacitors 100 are partially accommodated into the holes 56 of the first substrate 51, the first ground-side lands GL1 of the first substrate 51 and the second outer electrodes 22 can be easily brought into contact with each other so as to be electrically connected to each other.

Note that solder bumps that connect of the first hot-side lands HL1 of the first substrate 51 and the second hot-side lands HL2 of the second substrate 52 to each other may be provided depending on the design.

In addition, in the electronic component 350 that is described in International Publication No. 2018/088293 and illustrated in FIG. 13, it is necessary to connect the hot-side electrodes of the three-terminal capacitor 300 to the hot-side solder bumps 400H and connect the ground-side electrodes of the three-terminal capacitor 300 to the ground-side solder bumps 400G, and whether each solder bump defines and functions as the hot-side solder bump 400H or as the ground-side solder bump 400G depends on the specifications of the electronic component 350. Thus, the three-terminal capacitor 300 cannot be mounted at will, and if the electrodes of the three-terminal capacitor 300 are connected to wrong solder bumps, a short-circuit failure will occur.

In contrast, in the three-terminal capacitor 100 according to the present preferred embodiment, it is only necessary that one of the pair of first outer electrodes 21 is connected to one of the first hot-side lands HL1 of the first substrate 51 and that the other of the pair of first outer electrodes 21 is connected to one of the second hot-side lands HL2 of the second substrate 52. Thus, the three-terminal capacitor 100 according to the present preferred embodiment is easily mountable, and a short-circuit, such as that mentioned above, can be prevented from occurring.

In addition, since the electronic component 350 described in International Publication No. 2018/088293 has the configuration in which the three-terminal capacitor 300 is provided separately from the large number of solder bumps 400H, heat is likely to build up inside the electronic component 350. In contrast, by using the three-terminal capacitor 100 according to the present preferred embodiment, it is not necessary to provide solder bumps to connect the hot-side lands, and thus, the probability that heat will build up between the two substrates 51 and 52 can be reduced.

In the electronic component 350 described in International Publication No. 2018/088293, it is difficult to arrange a large number of three-terminal capacitors 300 between the motherboard 310 and the interposer 320, and thus, a decoupling capacitor 500 is disposed on the backside of the motherboard 310 as illustrated in FIG. 13. However, a signal line is lengthened in such a configuration, and consequently, there is a possibility that the responsivity will decrease or that the long signal line will pick up noise.

In contrast, since a larger number of the three-terminal capacitor 100 according to the present preferred embodiment can be arranged between the first substrate 51 and the second substrate 52 as described above, it is not necessary to provide a decoupling capacitor on the backside of the first substrate 51. Therefore, the probability that the responsivity will decrease and the probability of generation of noise, which have been described above, can be reduced.

In addition, in the electronic component 350 described in International Publication No. 2018/088293, since the three-terminal capacitor 300 is mounted separately from the solder bumps 400H, it requires more time and effort to mount the three-terminal capacitor 300, which in turn leads to a decrease in the productivity and an increase in the manufacturing costs. In contrast, in the three-terminal capacitor 100 according to the present preferred embodiment, since it is not necessary to provide solder bumps to connect the hot-side lands, mounting of the three-terminal capacitor 100 may be easily performed, and thus, an improvement in the productivity and cost reduction can be achieved.

Figure 6:
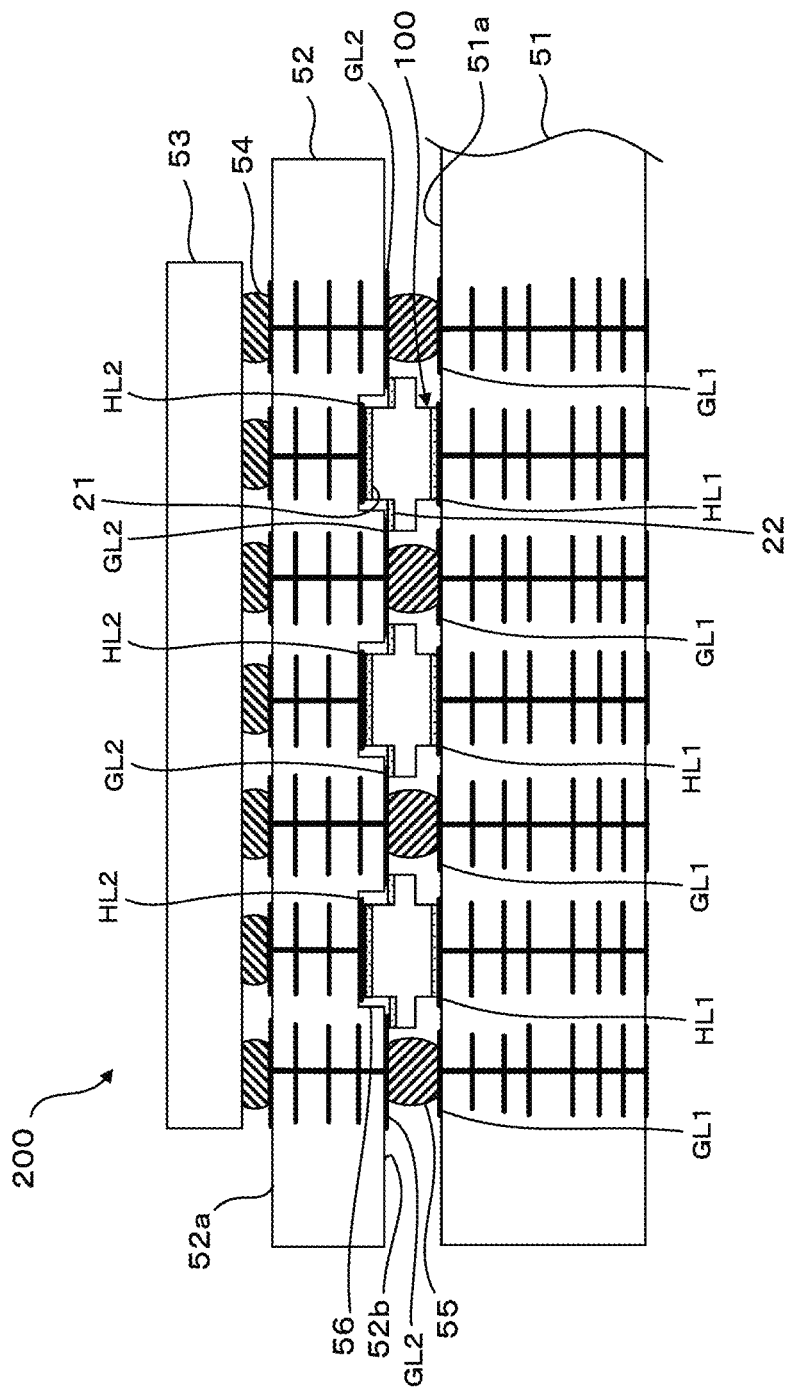
FIG. 6 is a sectional side view schematically illustrating another configuration example of the electronic component that includes the three-terminal capacitors according to the first preferred embodiment of the present invention.

FIG. 6 is a sectional side view schematically illustrating another configuration example of the electronic component 200 that includes the three-terminal capacitors 100 according to the present preferred embodiment. In the configuration example illustrated in FIG. 6, the holes 56 are provided in the second substrate 52, whereas the holes 56 are provided in the first substrate 51 in the configuration example illustrated in FIG. 5.

Each of the three-terminal capacitors 100 is disposed such that one of the pair of first outer electrodes 21 is positioned in one of the holes 56 of the second substrate 52 and such that the second outer electrode 22 is electrically connected to at least one of the second ground-side lands GL2 of the second substrate 52 by being in contact with the at least one second ground-side land GL2. In other words, the depth of each of the holes 56 is adjusted such that the second outer electrodes 22 are in contact with their respective second ground-side lands GL2 of the second substrate 52 in a state where the three-terminal capacitors 100 are partially accommodated in the holes 56.

The second hot-side lands HL2 are provided on the bottom surfaces of the holes 56 of the second substrate 52. In a state where the three-terminal capacitors 100 are partially accommodated in the holes 56, one of the pair of first outer electrodes 21 of each of the three-terminal capacitors 100 is electrically connected to the corresponding first hot-side land HL1 of the first substrate 51, and the other of the pair of first outer electrodes 21 is electrically connected to the corresponding second hot-side land HL2 of the second substrate 52.

Even with the above-described configuration, the three-terminal capacitors 100 according to the present preferred embodiment define and function not only as capacitors that remove high-frequency noise but also as solder bumps that electrically connect the first hot-side lands HL1 of the first substrate 51 and the second hot-side lands HL2 of the second substrate 52 to each other. In addition, the second outer electrode 22 of each of the three-terminal capacitors 100 is provided on the surface of the projecting portion 11 which projects from the main body 10, the surface being parallel or substantially parallel to the two end surfaces 10a and 10b of the main body 10, and thus, by arranging the three-terminal capacitors 100 such that the three-terminal capacitors 100 are partially accommodated into the holes 56 of the second substrate 52, the second ground-side lands GL2 of the second substrate 52 and the second outer electrodes 22 can be easily brought into contact with each other so as to be electrically connected to each other.

Figure 7:
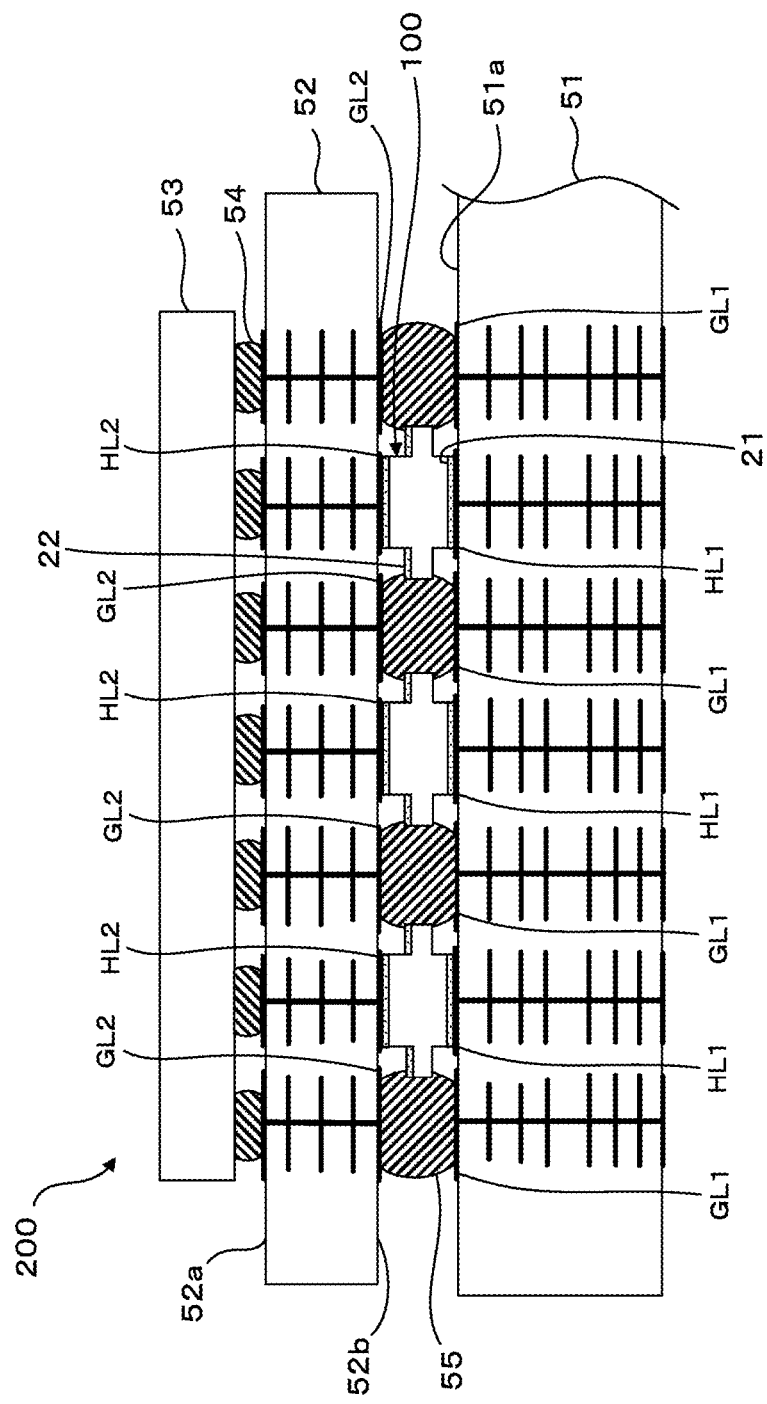
FIG. 7 is a sectional side view schematically illustrating another configuration example of the electronic component that includes the three-terminal capacitors according to the first preferred embodiment of the present invention.

FIG. 7 is a sectional side view schematically illustrating another configuration example of the electronic component 200 that includes the three-terminal capacitors 100 according to the present preferred embodiment. In the configuration example illustrated in FIG. 7, neither of the first substrate 51 and the second substrate 52 includes holes.

Each of the three-terminal capacitors 100 is disposed such that one of the pair of first outer electrodes 21 is electrically connected to one of the first hot-side lands HL1 of the first substrate 51 and such that the other of the pair of first outer electrodes 21 is electrically connected to one of the second hot-side lands HL2 of the second substrate 52. The second outer electrodes 22 of the three-terminal capacitors 100 are connected to the ground-side solder bumps 55, each of which connects one of the first ground-side lands GL1 of the first substrate 51 and one of the second ground-side lands GL2 of the second substrate 52 to each other, by being partially embedded in the solder bumps 55.

Even with the above-described configuration, the three-terminal capacitors 100 according to the present preferred embodiment define and function not only as capacitors that remove high-frequency noise but also as solder bumps that electrically connect the first hot-side lands HL1 of the first substrate 51 and the second hot-side lands HL2 of the second substrate 52 to each other. In addition, since the second outer electrode 22 of each of the three-terminal capacitors 100 is provided on the projecting portion 11 projecting from the main body 10, the second outer electrodes 22 are easily connectable to the ground-side solder bumps 55.

Second Preferred Embodiment

In the three-terminal capacitor 100 according to the first preferred embodiment, all of the first inner electrodes 1 have the same or substantially the same shape and the same or substantially the same size, and all of the second inner electrodes 2 have the same or substantially the same shape and the same or substantially the same size. In other words, the areas of all of the first inner electrodes 1 are equal or substantially equal, and the areas of all of the second inner electrodes 2 are equal or substantially the same.

In contrast, in a three-terminal capacitor 100 according to a second preferred embodiment of the present invention, the first inner electrodes 1 have different areas. More specifically, the areas of the first and second inner electrodes 1 and 2 decrease such that the first and second inner electrodes 1 and 2 closest to the center of the main body 10, which has a circular or substantially circular cylindrical shape, in the radial direction each have a larger area and such that the outermost first and second inner electrodes 1 and 2 in the lamination direction of the first and second inner electrodes 1 and 2 each have a smaller area. The external shape of the three-terminal capacitor 100 according to the second preferred embodiment is the same or substantially the same as the external shape of the three-terminal capacitor 100 according to the first preferred embodiment illustrated in FIG. 1.

Figure 8:
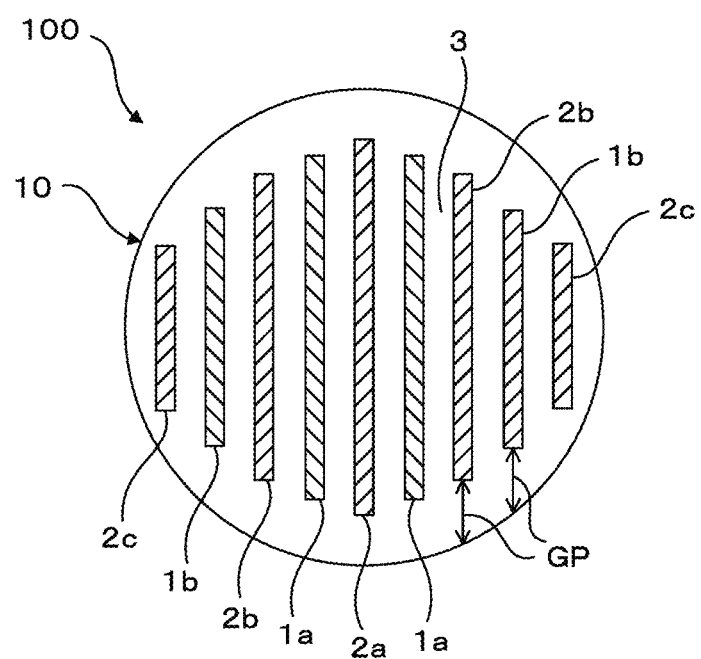
FIG. 8 is a schematic cross-sectional view of a three-terminal capacitor according to a second preferred embodiment of the present invention.

FIG. 8 is a schematic cross-sectional view of the three-terminal capacitor 100 according to the second preferred embodiment. The cross-sectional view illustrated in FIG. 8 and the cross-sectional view illustrated in FIG. 3 are obtained by cutting their respective three-terminal capacitors 100 in the same or substantially the same plane. In the case illustrated in FIG. 8, two types of first inner electrodes 1a and 1b having different sizes and three types of second inner electrodes 2a, 2b, and 2c having different sizes are provided. Note that the number of first inner electrodes 1 (1a and 1b) and the number of second inner electrodes 2 (2a, 2b, and 2c) are not limited to those illustrated in FIG. 8.

As illustrated in FIG. 8, in the lamination direction of the first and second inner electrodes 1 and 2, the first inner electrodes 1b are each located outside a corresponding one of the first inner electrodes 1a in the radial direction. In addition, in the lamination direction of the first and second inner electrodes 1 and 2, the second inner electrodes 2a, 2b, and 2c are arranged in this order from the side on which a central portion of the main body 10 in the radial direction is located to the outside.

Figure 9A:
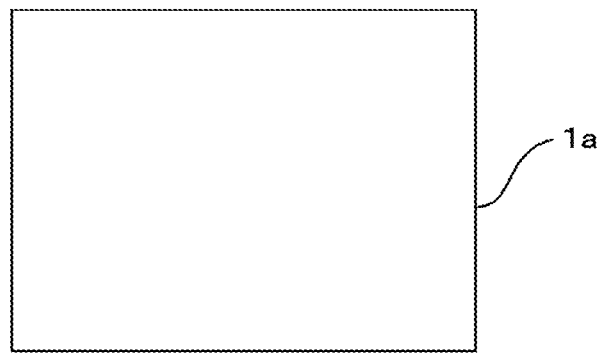
FIG. 9A and FIG. 9B are respectively a plan view illustrating the shape of a first inner electrode illustrated in FIG. 8 and a plan view illustrating the shape of another first inner electrode.
Figure 9B:
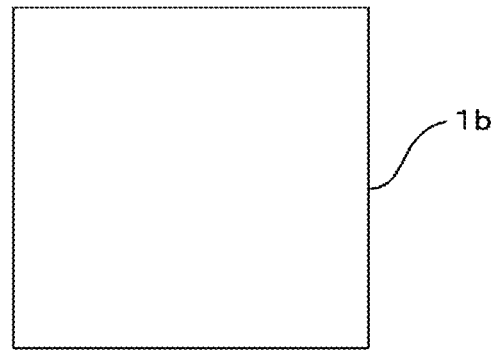

FIG. 9A is a plan view illustrating the shape of each of the first inner electrodes 1a illustrated in FIG. 8, and FIG. 9B is a plan view illustrating the shape of each of the first inner electrodes 1b. The two types of first inner electrodes 1a and 1b have the same or substantially the same dimension in the first direction and different dimensions in a width direction that is perpendicular or substantially perpendicular to the first direction. As illustrated in FIGS. 9A and 9B, the first inner electrodes 1b, which are located outside the first inner electrodes 1a in the radial direction of the main body 10, each have an area smaller than the area of each of the first inner electrodes 1a, which are positioned closer to the center of the main body 10 in the radial direction than are the first inner electrodes 1b.

Figure 10A:
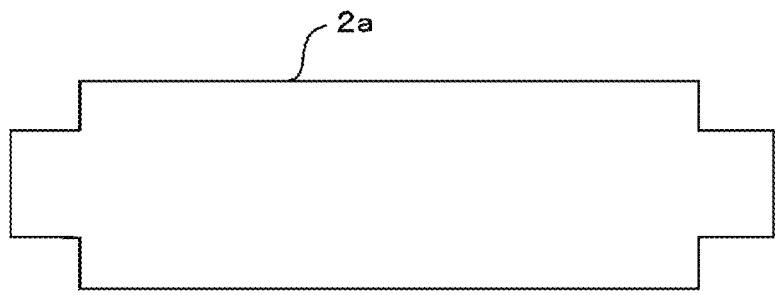
FIG. 10A is a plan view illustrating the shape of a second inner electrode illustrated in FIG. 8.
Figure 10B:
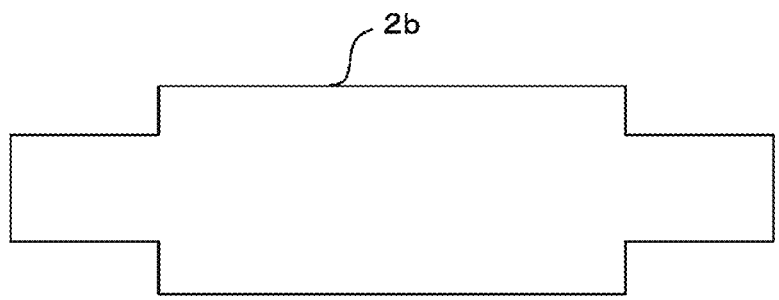
FIG. 10B is a plan view illustrating the shape of another second electrode.
Figure 10C:
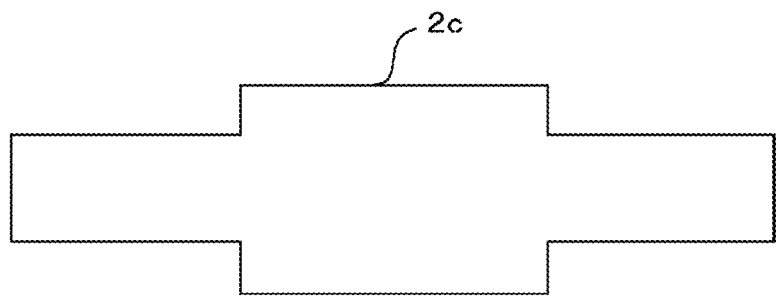
FIG. 10C is a plan view illustrating the shape of another second electrode.

FIG. 10A is a plan view illustrating the shape of the second inner electrode 2a illustrated in FIG. 8. FIG. 10B is a plan view illustrating the shape of each of the second inner electrodes 2b. FIG. 10C is a plan view illustrating the shape of each of the second inner electrodes 2c. The three types of second inner electrodes 2a, 2b, and 2c have the same or substantially the same dimension in the first direction. As illustrated in FIGS. 10A to 10C, among the three types of second inner electrodes 2a, 2b, and 2c, the second inner electrodes 2c that are the outermost second inner electrodes in the radial direction each have the smallest area, and the second inner electrode 2a that is closest to the center of the main body 10 in the radial direction has the largest area.

In a direction perpendicular or substantially perpendicular to the lamination direction of the first and second inner electrodes 1 and 2, it is preferable that dimensions GP (see FIG. 8) from end portions of the first inner electrodes 1a and 1b to the peripheral edge portion of the main body 10 and dimensions GP (see FIG. 8) from end portions of the second inner electrodes 2a, 2b, and 2c to the peripheral edge portion of the main body 10 are uniform. Each of the above-described dimensions GP is, for example, about 10 μm or more and about 50 μm or less and is set to about 30 μm as an example.

Similar to the three-terminal capacitor 100 according to the first preferred embodiment, a larger number of three-terminal capacitor 100 according to the second preferred embodiment can be provided between the two substrates.

In the three-terminal capacitor 100 according to the first preferred embodiment, since all of the first inner electrodes 1 have the same or substantially the same shape and the same or substantially the same size, and all of the second inner electrodes 2 have the same or substantially the same shape and the same or substantially the same size, the first inner electrodes 1 and the second inner electrodes 2 each need to have a size based on the inner electrodes 1 and 2 each of which is the outermost inner electrode in the radial direction and each of which has the smallest size.

In contrast, in the three-terminal capacitor 100 according to the second preferred embodiment, the areas of the first and second inner electrodes 1 and 2 decrease such that the first and second inner electrodes 1 and 2 closest to the center of the main body 10 in the radial direction each have a larger area and such that the outermost first and second inner electrodes 1 and 2 in the lamination direction of the first and second inner electrodes 1 and 2 each have a smaller area. In other words, the first inner electrodes 1 located at the center or approximate center in the radial direction can have a larger area, and thus, the capacity of the three-terminal capacitor 100 can be increased.

In addition, in the three-terminal capacitor 100 according to the first preferred embodiment, since the end portions of the first inner electrodes 1 and the end portions of the second inner electrodes 2 are aligned with one another (see FIG. 3), when pressing is performed during the manufacturing process, the amount of deformation in a region in which the inner electrodes 1 and 2 are not provided is larger than that in the region in which the inner electrodes 1 and 2 are provided. Thus, the distances between the inner electrodes 1 and 2 in the lamination direction decrease, and there is a possibility that the adjacent first and second inner electrodes 1 and 2 will come into contact with each other and will cause a short-circuit.

In contrast, in the three-terminal capacitor 100 according to the second preferred embodiment, since the end portions of the first inner electrodes 1 and the end portions of the second inner electrodes 2 are not aligned with one another (see FIG. 8), deformation in the end portions of the inner electrodes 1 and 2 due to pressing can be reduced or prevented, and the probability of the occurrence of a short-circuit can be reduced.

When a voltage is applied to the inner electrodes 1 and 2, deformation occurs due to the piezoelectric effect. In the three-terminal capacitor 100 according to the first preferred embodiment, since all of the first inner electrodes 1 have the same or substantially the same size, and all of the second inner electrodes 2 have the same or substantially the same size, separation of the first inner electrodes 1 and the second inner electrodes 2 from each other due to resonance is likely to occur in the end portions and center portions of the inner electrodes 1 and 2.

In contrast, in the three-terminal capacitor 100 according to the second preferred embodiment, since the first inner electrodes 1 and the second inner electrodes 2 have different sizes (see FIG. 9A to FIG. 10C), when a voltage is applied to the inner electrodes 1 and 2, deformation occurs in different portions of the inner electrodes 1 and 2, and the amount of deformation differs between the inner electrodes 1 and 2. As a result, the probability of the occurrence of separation of the first inner electrodes 1 and the second inner electrodes 2 from each other can be reduced.

Note that, in the three-terminal capacitor 100 illustrated in FIG. 8, the areas of the first inner electrodes 1 gradually decrease starting from the area of the first inner electrode 1 closest to the center in the radial direction to the area of the outermost first inner electrode 1. Although there are no first inner electrodes having the same or substantially the same area, some of the first inner electrodes may have the same or substantially the same area. In other words, in the lamination direction of the first and second inner electrodes 1 and 2, the areas of the first inner electrodes 1 may at least decrease in a stepwise manner starting from the area of the first inner electrode 1 closest to the center in the radial direction to the area of the outermost first inner electrode 1. Similarly, in the lamination direction of the first and second inner electrodes 1 and 2, the areas of the second inner electrodes 2 may at least decrease in a stepwise manner starting from the area of the second inner electrode 2 closest to the center in the radial direction to the area of the outermost second inner electrode 2.

Third Preferred Embodiment

In the three-terminal capacitor 100 according to the first preferred embodiment and the three-terminal capacitor 100 according to second preferred embodiment, the first inner electrodes 1, the dielectric layers 3, and the second inner electrodes 2 are laminated together in the direction that is perpendicular or substantially perpendicular to the first direction (the Y direction in FIG. 1), which is the direction in which the pair of first outer electrodes 21 face each other.

In contrast, in a three-terminal capacitor 100 according to a third preferred embodiment of the present invention, the first inner electrodes 1, the dielectric layers 3, and the second inner electrodes 2 are laminated together in the first direction.

Figure 11:
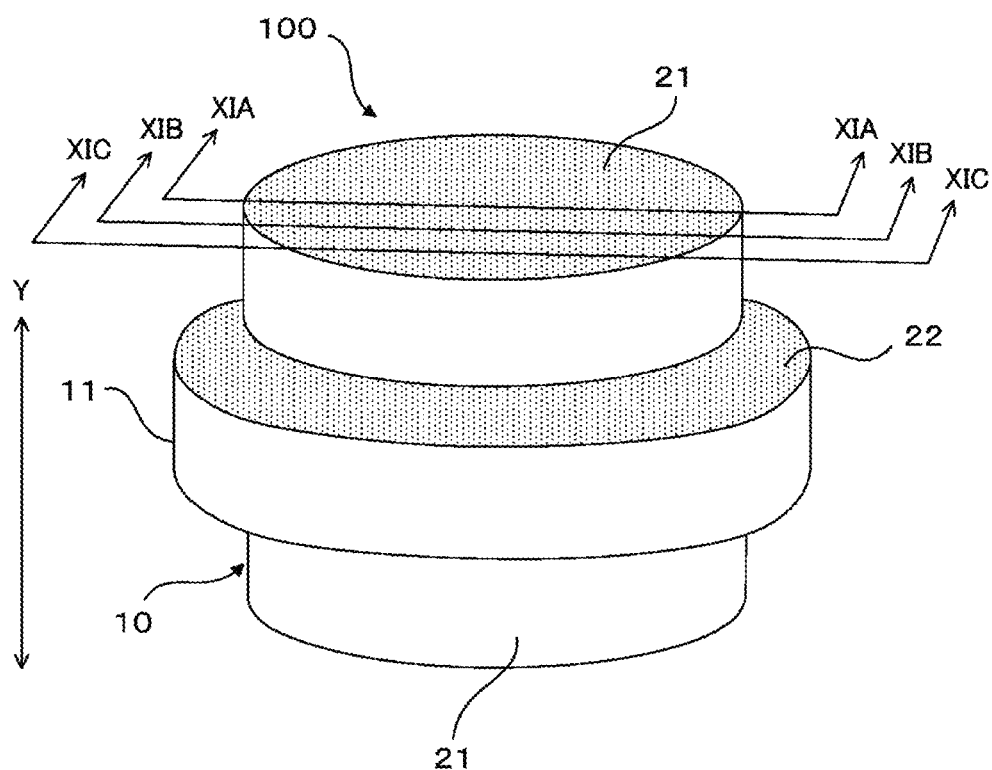
FIG. 11 is a perspective view schematically illustrating a configuration of a three-terminal capacitor according to a third preferred embodiment of the present invention.

FIG. 11 is a perspective view schematically illustrating a configuration of the three-terminal capacitor 100 according to the third preferred embodiment. The external configuration of the three-terminal capacitor 100 according to the third preferred embodiment is the same or substantially the same as the external configuration of the three-terminal capacitor 100 according to the first preferred embodiment illustrated in FIG. 1.

Figure 12:
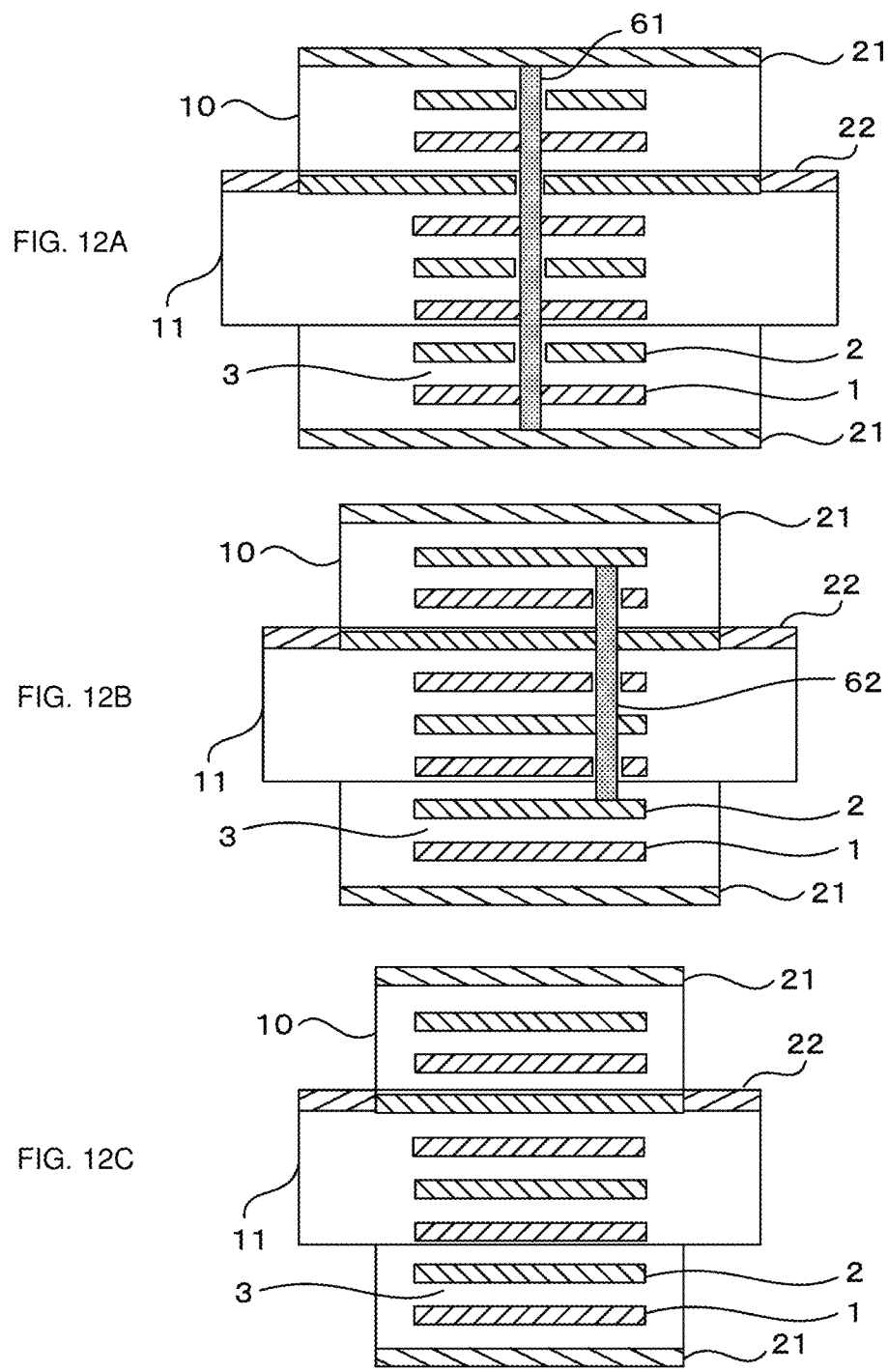
FIG. 12A is a schematic cross-sectional view of the three-terminal capacitor illustrated in FIG. 11 taken along line XIA-XIA of FIG. 11.
FIG. 12B is a schematic cross-sectional view of the three-terminal capacitor taken along line XIB-XIB of FIG. 11.
FIG. 12C is a schematic cross-sectional view of the three-terminal capacitor taken along line XIC-XIC of FIG. 11.

FIG. 12A is a schematic cross-sectional view of the three-terminal capacitor 100 illustrated in FIG. 11 taken along line XIA-XIA of FIG. 11. FIG. 12B is a schematic cross-sectional view of the three-terminal capacitor 100 taken along line XIB-XIB of FIG. 11. FIG. 12C is a schematic cross-sectional view of the three-terminal capacitor 100 taken along line XIC-XIC of FIG. 11.

In the present preferred embodiment, the first inner electrodes 1 each have a rectangular or substantially rectangular shape, and all of the first inner electrodes 1 have the same or substantially the same shape and the same or substantially the same size. The second inner electrodes 2 each have a rectangular or substantially rectangular shape, and all of the second inner electrodes 2 have the same or substantially the same shape and the same or substantially the same size. However, the shape of each of the first inner electrodes 1 and the shape of each of the second inner electrodes 2 are not limited to a rectangular or substantially rectangular shape. For example, the first inner electrodes 1 and the second inner electrodes 2 may each have a circular or substantially circular shape so as to follow the shape of the main body 10, which is a circular substantially circular cylindrical shape.

As illustrated in FIG. 12A, a first via 61 that electrically connects the plurality of first inner electrodes 1 is provided in the main body 10. The first via 61 is electrically connected to all of the first inner electrodes 1 and is not electrically connected to the second inner electrodes 2. The second inner electrodes 2 each include a hole in order to avoid connection with the first via 61. The first via 61 is connected to the first outer electrodes 21 provided on the two end surfaces of the main body 10 in the first direction. With such a configuration, all of the first inner electrodes 1 are electrically connected to the first outer electrodes 21.

As illustrated in FIG. 12B, a second via 62 that electrically connects the plurality of second inner electrodes 2 is provided in the main body 10. The second via 62 is electrically connected to all of the second inner electrodes 2 and is not electrically connected to the first inner electrodes 1. The first inner electrodes 1 each include a hole in order to avoid connection with the second via 62. As illustrated in FIGS. 12A to 12C, the second outer electrode 22 provided on the projecting portion 11 of the main body 10 is connected to at least one of the plurality of second inner electrodes 2, the at least one second inner electrode 2 being located at the center in the first direction. With such a configuration, all of the second inner electrodes 2 are electrically connected to the second outer electrode 22.

Similar to the three-terminal capacitor 100 according to the first preferred embodiment, a larger number of three-terminal capacitors 100 according to the third preferred embodiment can be provided between two substrates. In addition, electrodes having the same or substantially the same shape can be used as the first inner electrodes 1 and the second inner electrodes 2, and thus, the manufacturing costs can be reduced.

Note that, similar to the three-terminal capacitor 100 according to the first preferred embodiment, the three-terminal capacitor 100 according to the third preferred embodiment can be manufactured by using a 3D printer.

The present invention is not limited to the above-described preferred embodiments, and various applications and modifications can be made within the scope of the present invention.

For example, in the above-described electronic component 200, the three-terminal capacitors 100 are arranged such that one of the pair of first outer electrodes 21 of each of the three-terminal capacitors 100 and the other of the pair of first outer electrodes 21 are respectively connected to one of the first hot-side lands HL1 of the first substrate 51 and one of the second hot-side lands HL2 of the second substrate 52 and such that the second outer electrodes 22 of the three-terminal capacitors 100 are electrically connected to at least one of the first ground-side lands GL1 and the second ground-side lands GL2. However, the three-terminal capacitors 100 may be arranged such that one of the pair of first outer electrodes 21 of each of the three-terminal capacitors 100 and the other of the pair of first outer electrodes 21 are respectively connected to one of the first ground-side lands GL1 of the first substrate 51 and one of the second ground-side lands GL2 of the second substrate 52 and such that the second outer electrodes 22 of the three-terminal capacitors 100 are electrically connected to the first hot-side lands HL1 of the first substrate 51 and the second hot-side lands HL2 of the second substrate 52.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-terminal capacitor comprising:
a main body having a cylindrical or substantially cylindrical shape extending in a first direction and including first inner electrodes and second inner electrodes alternately laminated together with dielectric layers interposed between the first inner electrodes and the second inner electrodes;
a pair of first outer electrodes on two end surfaces of the main body in the first direction and electrically connected to the first inner electrodes; and
a second outer electrode electrically connected to the second inner electrodes; wherein
the main body includes a projecting portion projecting in a direction perpendicular or substantially perpendicular to the first direction at a position between the pair of first outer electrodes;
the second outer electrode is on one of surfaces of the projecting portion viewable when viewed in the first direction;
the first inner electrodes, the dielectric layers, and the second inner electrodes are laminated together in a direction perpendicular or substantially perpendicular to the first direction;
the first inner electrodes each have a rectangular or substantially rectangular shape and are electrically connected to the first outer electrodes at the two end surfaces of the main body; and
the second inner electrodes each have a cross shape or a substantially cross shape and are electrically connected to the second outer electrode at the surface of the projecting portion that is parallel or substantially parallel to the two end surfaces of the main body.

2. The three-terminal capacitor according to claim 1, wherein
the projecting portion includes a surface parallel or substantially parallel to the two end surfaces of the main body; and
the surface that is viewable when viewed in the first direction is one of the surfaces of the projecting portion parallel or substantially parallel to the two end surfaces of the main body.

3. The three-terminal capacitor according to claim 1, wherein the main body has a circular or substantially circular cylindrical shape.

4. A three-terminal capacitor comprising:
a main body having a cylindrical or substantially cylindrical shape extending in a first direction and including first inner electrodes and second inner electrodes alternately laminated together with dielectric layers interposed between the first inner electrodes and the second inner electrodes;
a pair of first outer electrodes on two end surfaces of the main body in the first direction and electrically connected to the first inner electrodes; and
a second outer electrode electrically connected to the second inner electrodes; wherein
the main body includes a projecting portion projecting in a direction perpendicular or substantially perpendicular to the first direction at a position between the pair of first outer electrodes;
the second outer electrode is on one of surfaces of the projecting portion viewable when viewed in the first direction;
the main body has a circular or substantially circular cylindrical shape; and
areas of the first and second inner electrodes decrease such that the first and second inner electrodes closest to the center of the main body in a radial direction of the main body each have a larger area and outermost of the first and second inner electrodes in a direction in which the first and second inner electrodes are laminated together each have a smaller area.

5. An electronic component comprising:
a three-terminal capacitor;
a first substrate including a mounting surface on which a first hot-side land and a first ground-side land are provided; and
a second substrate including a surface that faces the mounting surface and on which a second hot-side land and a second ground-side land are provided; wherein
the three-terminal capacitor includes:
a main body having a cylindrical or substantially cylindrical shape extending in a first direction and including first inner electrodes and second inner electrodes alternately laminated together with dielectric layers interposed between the first inner electrodes and the second inner electrodes;
a pair of first outer electrodes on two end surfaces of the main body in the first direction and electrically connected to the first inner electrodes; and
a second outer electrode electrically connected to the second inner electrodes;
the main body includes a projecting portion projecting in a direction perpendicular or substantially perpendicular to the first direction at a position between the pair of first outer electrodes;
the second outer electrode is on one of surfaces of the projecting portion viewable when viewed in the first direction; and
the three-terminal capacitor is disposed such that one of the pair of first outer electrodes and another one of the pair of first outer electrodes are respectively connected to the first hot-side land and the second hot-side land and such that the second outer electrode is electrically connected to at least one of the first ground-side land and the second ground-side land.

6. The electronic component according to claim 5, wherein the first inner electrodes, the dielectric layers, and the second inner electrodes are laminated together in the first direction.

7. The electronic component according to claim 6, wherein the main body further includes a first via electrically connecting the first inner electrodes to one another and a second via electrically connecting the second inner electrodes to one another.

8. The electronic component according to claim 5, wherein
the projecting portion includes a surface parallel or substantially parallel to the two end surfaces of the main body; and
the surface that is viewable when viewed in the first direction is one of the surfaces of the projecting portion parallel or substantially parallel to the two end surfaces of the main body.

9. The electronic component according to claim 5, wherein the first inner electrodes, the dielectric layers, and the second inner electrodes are laminated together in a direction perpendicular or substantially perpendicular to the first direction.

10. The electronic component according to claim 9, wherein
the first inner electrodes each have a rectangular or substantially rectangular shape and are electrically connected to the first outer electrodes at the two end surfaces of the main body; and
the second inner electrodes each have a cross shape or a substantially cross shape and are electrically connected to the second outer electrode at the surface of the projecting portion that is parallel or substantially parallel to the two end surfaces of the main body.

11. The electronic component according to claim 5, wherein the main body has a circular or substantially circular cylindrical shape.

12. The electronic component according to claim 11, wherein areas of the first and second inner electrodes decrease such that the first and second inner electrodes closest to the center of the main body in a radial direction of the main body each have a larger area and outermost of the first and second inner electrodes in a direction in which the first and second inner electrodes are laminated together each have a smaller area.

13. An electronic component comprising:
a three-terminal capacitor;
a first substrate including a mounting surface on which a first hot-side land and a first ground-side land are provided; and
a second substrate including a surface that faces the mounting surface and on which a second hot-side land and a second ground-side land are provided; wherein
the three-terminal capacitor includes:
a main body having a cylindrical or substantially cylindrical shape extending in a first direction and including first inner electrodes and second inner electrodes alternately laminated together with dielectric layers interposed between the first inner electrodes and the second inner electrodes;
a pair of first outer electrodes on two end surfaces of the main body in the first direction and electrically connected to the first inner electrodes; and
a second outer electrode electrically connected to the second inner electrodes;
the main body includes a projecting portion projecting in a direction perpendicular or substantially perpendicular to the first direction at a position between the pair of first outer electrodes;
the second outer electrode is on one of surfaces of the projecting portion viewable when viewed in the first direction; and
the three-terminal capacitor is disposed such that one of the pair of first outer electrodes and another one of the pair of first outer electrodes are respectively connected to the first ground-side land and the second ground-side land and such that the second outer electrode is electrically connected to the first hot-side land and the second hot-side land.

14. The electronic component according to claim 13, wherein
the projecting portion includes a surface parallel or substantially parallel to the two end surfaces of the main body; and
the surface that is viewable when viewed in the first direction is one of the surfaces of the projecting portion, the one surface being parallel or substantially parallel to the two end surfaces of the main body.

15. The electronic component according to claim 13, wherein the first inner electrodes, the dielectric layers, and the second inner electrodes are laminated together in a direction perpendicular or substantially perpendicular to the first direction.

16. The electronic component according to claim 15, wherein
the first inner electrodes each have a rectangular or substantially rectangular shape and are electrically connected to the first outer electrodes at the two end surfaces of the main body; and the second inner electrodes each have a cross shape or a substantially cross shape and are electrically connected to the second outer electrode at the surface of the projecting portion that is parallel or substantially parallel to the two end surfaces of the main body.

17. The electronic component according to claim 13, wherein the main body has a circular or substantially circular cylindrical shape.

18. The electronic component according to claim 17, wherein areas of the first and second inner electrodes decrease such that the first and second inner electrodes closest to the center of the main body in a radial direction of the main body each have a larger area and outermost of the first and second inner electrodes in a direction in which the first and second inner electrodes are laminated together each have a smaller area.

19. The three-terminal capacitor according to claim 13, wherein the first inner electrodes, the dielectric layers, and the second inner electrodes are laminated together in the first direction.

20. The three-terminal capacitor according to claim 19, wherein the main body further includes a first via electrically connecting the first inner electrodes to one another and a second via electrically connecting the second inner electrodes to one another.

* * * * *